(12) United States Patent
Laferla

(10) Patent No.: US 6,402,967 B1
(45) Date of Patent: Jun. 11, 2002

(54) GREASE SEPARATING DEVICE AND METHOD

(75) Inventor: Richard Laferla, Granville (AU)

(73) Assignee: Eclipse Environmental Australia Pty Limited, New South Wales (AU)

(*) Notice: Subject to any disclaimer, the term of this patent is extended or adjusted under 35 U.S.C. 154(b) by 0 days.

(21) Appl. No.: 09/403,888

(22) PCT Filed: Apr. 29, 1998

(86) PCT No.: PCT/AU98/00310

§ 371 (c)(1),
(2), (4) Date: Dec. 7, 1999

(87) PCT Pub. No.: WO98/50644

PCT Pub. Date: Nov. 12, 1998

(30) Foreign Application Priority Data

May 1, 1997 (AU) .............................................. PO 6595

(51) Int. Cl.⁷ .................................................. C02F 1/40
(52) U.S. Cl. .................... 210/799; 210/457; 210/502.1; 210/908
(58) Field of Search ................................ 210/799, 457, 210/502.1, 908, 800

(56) References Cited

U.S. PATENT DOCUMENTS 4,619,114 A * 10/1986 Wilson

RE36,774 E * 7/2000 Cosentino

FOREIGN PATENT DOCUMENTS

| DE | 2747469 | 5/1979 |
|----|---------|--------|
| DE | 3733688 | 4/1988 |
| DE | 3704911 | 8/1988 |
| DE | 3902155 | 7/1990 |
| DE | 29612694 | 11/1996 |
| EP | 013412 | 7/1980 |
| EP | 046276 | 2/1982 |
| EP | 0350579 | 1/1990 |
| GB | 1517715 | 7/1978 |
| GB | 2245609 | 1/1992 |

* cited by examiner

Primary Examiner—Chester T. Barry
(74) Attorney, Agent, or Firm—Jordan and Hamburg LLP

(57) ABSTRACT

A device (10) and method for separating oleaginous matter from a waste fluid. The device (10) includes a chamber (11) having a fluid inlet (19) and a fluid outlet (15) between which a fluid, such as waste water, may pass through the chamber (11). The chamber (11) contains a plurality of oleophilic polypropylene cylindrical rods (14) disposed in the fluid flow path between the inlet and outlet. The rods (14) being oleophilic attract and separate the oleaginous matter from the fluid passing through the chamber (11). The chamber (11) can also be mounted within a larger vessel (20) and over a holding container (30) that provides further treatments of the fluid passing through the device.

31 Claims, 2 Drawing Sheets

GREASE SEPARATING DEVICE AND METHOD

FIELD OF THE INVENTION

The present invention relates to a device for separating oils, grease, fats and solid particles such as food scraps from waste water before the water enters the sewage or drainage system.

BACKGROUND ART

Restaurants and other establishments dealing in the manufacture, processing, serving and sale of food can generate large quantities of waste water. Such waste water may be generated in a food processing step or simply from the washing of cookware, utensils, crockery, cutlery and other items used in the processing and serving of food. This waste water which typically contains large quantities of oils fats, grease and food scraps often ends up in drainage or sewerage systems and leads to pollution of waterways and the clogging of drains.

The disposal of food wastes in water into the drainage and sewerage systems is accordingly, highly undesirable and in recent times the governmental authorities of many countries have moved to set stricter criteria as to the levels of food wastes that may enter these waste water disposal systems.

It would be desirable to provide a device that readily substantially separated grease, fats, oils and other wastes including food scraps from waste water before that water entered the sewage and drainage systems.

SUMMARY OF THE INVENTION

According to a first aspect, the present invention consists in a device for separating oleaginous matter from a waste fluid, the device including a chamber having a fluid inlet and a fluid outlet between which a fluid may pass through the chamber and containing a plurality of members disposed in the fluid flow path between the inlet and outlet, at least the outer surfaces of the members being oleophilic so as to attract and separate the oleaginous matter from the fluid passing through the chamber.

In the present specification, the term "oleaginous matter" is to be taken to include oils, fats and grease whether it be in the form of a solid or liquid.

In one embodiment, the chamber comprises an upright cylinder closed at a first upper end and a second lower end. Within the chamber, the plurality of members can substantially fill the chamber.

The members can each comprise a rod of oleophilic material or a material that has been rendered oleophilic. The rods can have an outer surface with few or no corners. The rods are preferably solid cylindrical rods. In one embodiment, the rods are a polymeric material, preferably polypropylene. The polypropylene rods may be etched or micro-blasted prior to use to increase their oleophilic properties.

The plurality of members in the chamber can be aligned and extend from the first end to the second end. The rods are preferably closely packed and so arranged that any oleaginous matter, including globules of oil or a solid particle, if travelling perpendicularly to the alignment of the rods must move in a non-linear path thereby increasing the likelihood of this matter striking or being attracted to a member. The members are preferably packed in concentric rings with the spacing between the members in each ring decreasing from the outer ring to the inner ring. This spacing ensures that as any oleaginous matters moves through the chamber, the likelihood of it striking or being attracted to a member increases from the most outer ring to the most inner ring. The members can be packed in two concentric rings only.

The concentric rings and members are preferably disposed around a central outlet in the second lower end of the chamber. The outlet can have a mounting for connecting the outlet to a drainage pipe. In one embodiment, the drainage pipe can have a first outwardly extending portion, an upwardly extending portion, a second outwardly extending portion, and then a downwardly extending portion so as to form an upwardly extending S-bend. The height of the second outwardly extending portion relative to the height of the outlet of the chamber sets the minimum depth of the fluid in the chamber when in use. In another embodiment, the outlet can have an extension pipe that extends upwardly into the chamber. The upper end of the upward extension of the outlet preferably extends into an opening of a larger pipe extending downwardly from the first end and so forming a baffle through which the fluid exits the chamber. The height of the outlet extension into the chamber in this embodiment sets the minimum height of the fluid in the chamber at any one time to thereby form an airlock.

In a preferred embodiment, the outlet of the chamber can be mounted over a fluid holding container. In such an embodiment, the drainage pipe will preferably extend outwardly from the end of the holding container proximate its connection to the fluid outlet of the chamber. The fluid holding container can preferably be used to contain a quantity of bacteria that preferably are capable of breaking down oleaginous matter. The bacteria can be added to the holding container deliberately. Alternatively, natural bacteria already present in the oleaginous matters call be relied upon to colonise the holding container during use. In use, the holding container would normally fill with fluid draining firm the chamber with the majority of the fluid only exiting the holding container when the fluid level reaches a depth sufficient to drain through the drainage pipe extending outwardly therefrom.

In one embodiment, a number of fluid inlets can be provided into the chamber. Each fluid inlet preferably comprises an orifice in the cylindrical outer surface of the chamber. The inlet can comprise a small pipe that is preferably disposed substantially perpendicularly to the longitudinal axis of the members and substantially tangentially to the surface of the chamber. Each fluid inlet is preferably disposed adjacent the second lower end of the chamber. This arrangement serves to ensure that the waste fluid swirls into the chamber with the oleaginous matter being directed into the array of members.

The chamber in turn can be disposed within a larger vessel. The larger vessel preferably comprises a multi-sided upright vessel having a first upper end and a second lower end. In one embodiment, the vessel can be substantially octagonal in horizontal cross-section.

The chamber of the separating device is preferably mounted adjacent the first upper end of the larger vessel. In use, the vessel is preferably adapted such that the fluid level in the vessel is maintained above the fluid inlets of the chamber.

The larger vessel preferably has an inlet located proximate its upper end and arranged to direct the waste fluid substantially tangentially into and around the perimeter of the vessel. Heavy particles, such as heavy food scraps, are preferably expelled in the fluid to proximate the wall of the larger vessel where they slow down and sink to the bottom of the vessel for later recovery.

Oil and other similar oleaginous matter in the waste fluid will preferentially rise to the surface of the waste fluid in the vessel and so be prevented from entering the inlets of the chamber surrounding the separating device by the chamber wall.

Fine oil particles and smaller food scraps that do enter the fluid inlets of the chamber are directed into the separating device as described above.

The device is preferably arranged to trap oils, grease, fats and food particles in waste water produced by restaurants and other establishments involved in the production, processing serving and sale of food.

In a still further aspect, the present invention comprises a method for separating oleaginous matter from a waste fluid including the steps of feeding the waste fluid through the separating device according to the first aspect of the present invention and separating the oleaginous matter therefrom.

In yet a further aspect, the present invention comprises a method for treating waste fluid containing oleaginous matter including the steps of feeding the waste fluid into the larger vessel defined herein and separating the oleaginous matter therefrom.

BRIEF DESCRIPTION OF THE DRAWINGS

Preferred embodiments of the invention are now described with reference to the accompanying drawings, in which.

PREFERRED MODE OF CARRYING OUT THE INVENTION

A device for separating oleaginous matter, such as oils, fats, grease, and solid particles such as food scraps from waste water generated by restaurants and other establishments involved in the processing, preparation, serving and sale of food is generally depicted as 10 in tile drawings.

Figure 1:
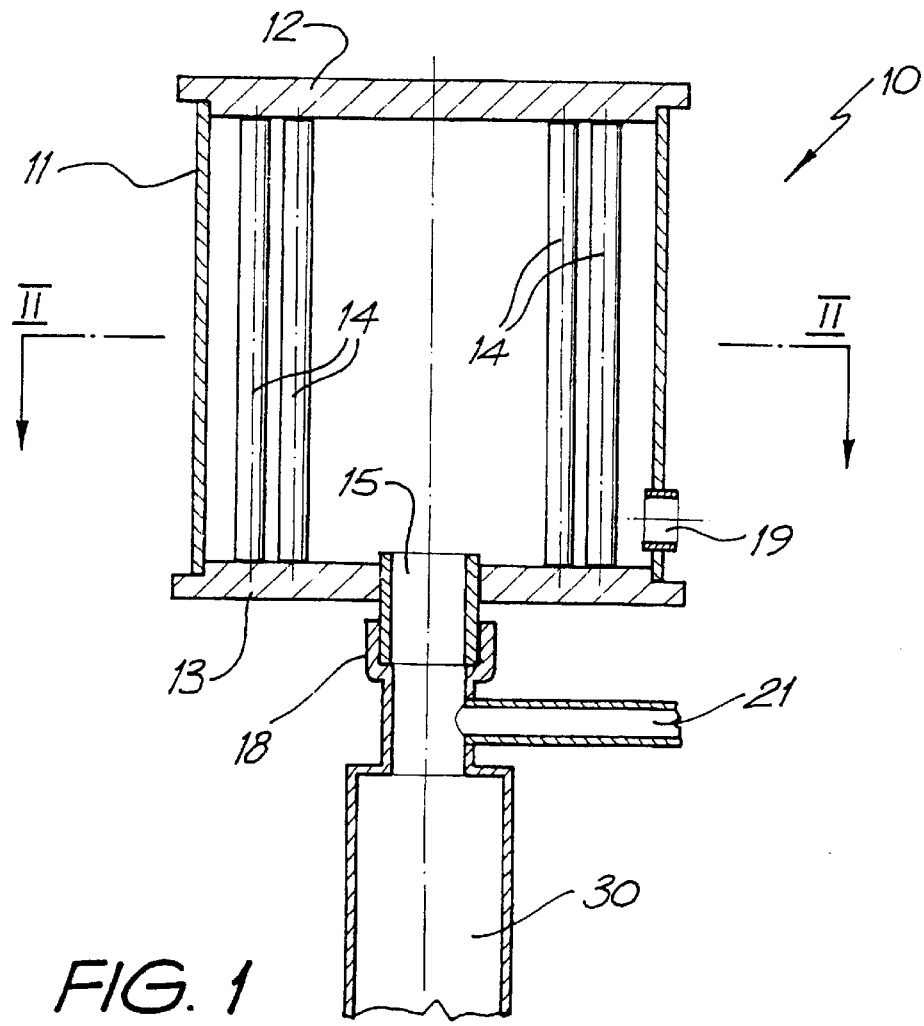
FIG. 1 is a simplified vertical cross-sectional view of a chamber according to the present invention.
Figure 3:
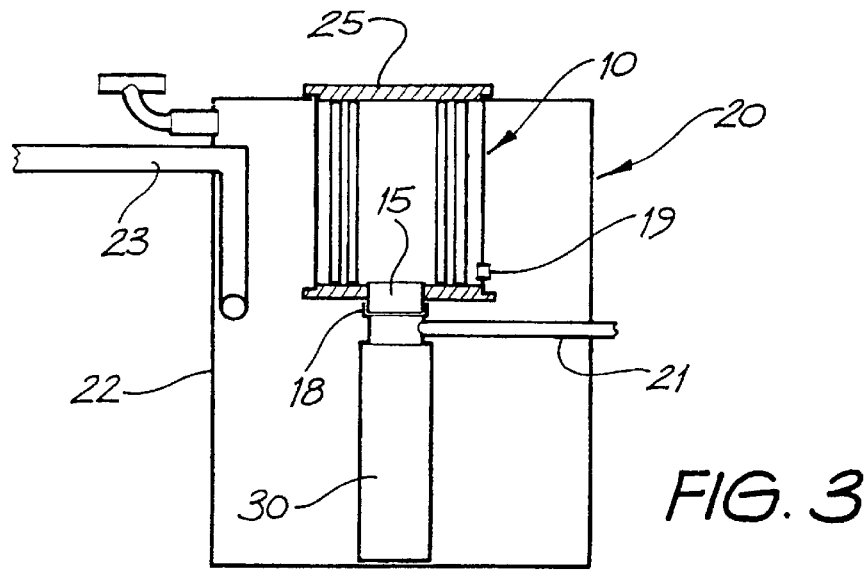
FIG. 3 is a simplified vertical cross-sectional view of the chamber of FIGS. 1 and 2 mounted in a larger treatment vessel.

The separating device 10 comprises a upright cylindrical chamber 11 sealed by a removable top plate 12 and a bottom plate 13. The chamber 11 is substantially filled with a plurality of cylindrical polypropylene rods 14 (only some of which are depicted in FIGS. 1 and 3), which extend from the top plate 12 to the bottom plate 13. The rods 14 are supported in a frame such that all rods 14 may be removed, if required from the chamber simultaneously.

The polypropylene rods 14 are oleophilic and will attract and retain on their surface, globules of oil, fat and grease thereby substantially removing these substances from waste water passing through the device 10.

Figure 2:
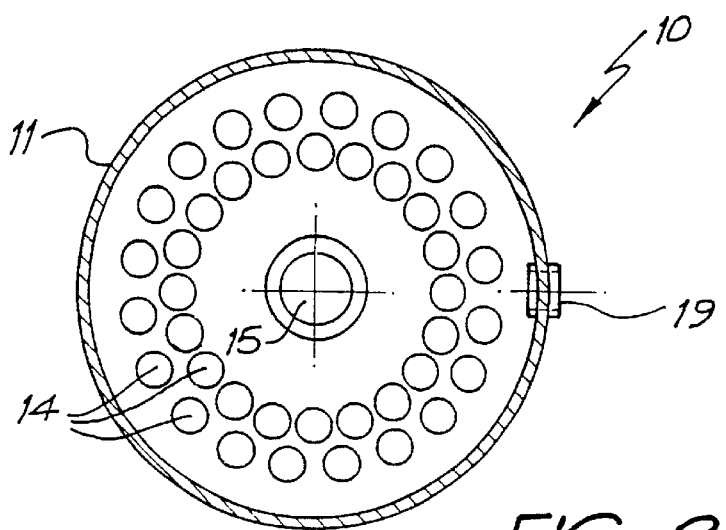
FIG. 2 is a simplified horizontal cross-sectional view of the chamber of FIG. 1 along line II—II of FIG. 1.

As is depicted in FIG. 2, the rods 14 are packed in two concentric rings such that the spacing between the rods 14 in each ring decrease from the outer ring to the inner ring. This decrease in separation between the rods 14 serves to increase the likelihood of the globules of oils, fats, grease and food scraps being trapped by the rods 14 as they pass through the chamber 11.

An inlet orifice 19 is provided for the waste water entraining the oils, fats, grease and other substances into the chamber 11. The inlet orifice can be replaced with a pipe mounted substantially tangentially to the cylindrical wall of the chamber 11 and at approximately 90 degrees to the longitudinal axes of the rods 14. Such an alignment of the inlet ensures that the waste water swirls into the chamber 11 and towards the rods 14.

The chamber 11 has an outlet pipe 15 centrally mounted in the bottom plate 13. The outer portion of the pipe 15 has a mounting 18 to allow the pipe to be connected to a pipe 21 (see FIGS. 3 and 4) that leads through an S-bend 24 to the drainage or sewage system. Disposed below the main chamber 11 is a further fluid holding container 30. When in use the holding container 30 will fill with waste water draining from the chamber 11 before it then starts to exit the device through pipe 21. After a reasonable level of use, bacteria that feeds on oleaginous matter will normally colonise the water in the holding container 30. This bacteria selves to provide a further treatment of the water as it passes through the device 10.

The device 10 can be made to any dimensions suitable for the requirements of a particular purpose. The chamber 11 in the embodiment depicted in the drawings is 300 mm in height and if used alone can be readily mounted under a sink or other convenient location.

Figure 4:
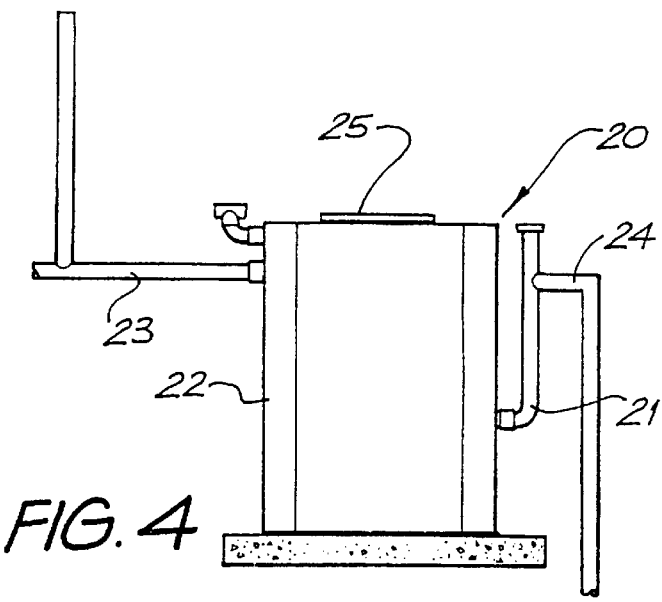
FIG. 4 is a simplified side elevational view of the treatment vessel of FIG. 3.
Figure 5:
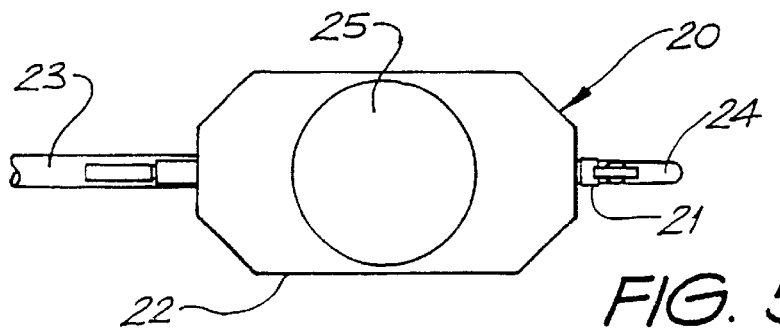
FIG. 5 is a plan view of the treatment vessel of FIGS. 3 and 4.

In one embodiment as depicted in FIGS. 3–5, the separating device 10 can be housed in a larger vessel generally depicted as 20 in these drawings. As depicted in FIG. 5, the vessel 20 is substantially octagonal in horizontal cross-section and has an inlet pipe 23 connected to the source of waste water, such as a sink. The inlet pipe 23 is adapted to direct fluid into the vessel 20 substantially tangentially along the wall 22 of the vessel. In the depicted embodiment, the vessel 20 is fabricated from high density polyethylene and has a height of 1200 mm, a width of 600 mm and a length of 900 mm.

Heavy particles in the waste water, such as heavy food scraps, are expelled by the action of the water in the vessel to proximate the wall 22 where they eventually slow down and sink to the bottom of the vessel 20 for later recovery.

Oil in the waste fluid will preferentially rise to the surface of the waste fluid in the vessel. As the inlets 19 (only one of which is depicted in the drawings) of the chamber 11 are disposed below the minimum water level set in the vessel 20 by the S-bend 24 in the outlet pipe 21, the majority of the oil in the waste water is prevented from entering the separating device 10 and is held in the vessel 20. As is depicted in FIG. 5, the position of the inlets 19 can be distal to that of the inlet pipe 23 in the vessel 20 such that the any oils or scraps must firstly travel at least half way around the vessel 20 before entering the inlets 19. Such an arrangement further serves to minimise the likelihood of larger food scraps and oil entering the separating device. When necessary, the oil trapped in the vessel 20 can be recovered.

The fine oil particles and smaller food scraps that do enter the fluid inlets 19 of the chamber 11 are directed into the separating device 10 as depicted in FIGS. 1 and 2 described above. The cleaner water resulting from the process then drains through outlet pipe 15 and will normally enter the holding container 30. While resident in the holding chamber, any remaining oleaginous matter will also undergo further processing by any bacteria present in the chamber 30 that are adapted to breakdown oleaginous matter. When the holding chamber fills, the water drains by pipe 21 and passes through S-bend 24 to the drain or sewer. The S-bend 24 serves to retain any unpleasant smells within the chamber 11.

When the device 10 is filled with grease, oils, fats and other substances, the lid 25 of the vessel 20 can be removed allowing access to the chamber 11. After recovery, the chamber 11 is drained removed for cleaning and then re-positioned ready for re-use.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A device for separating oleaginous matter from waste fluid, comprising:
   structure defining a chamber, said chamber having a fluid inlet and a fluid outlet between which a fluid may pass through the chamber; and
   aligned members disposed within the chamber in the fluid flow path between the inlet and the outlet, the members being closely packed and so arranged that any oleaginous matter, if travelling perpendicularly to the alignment of the members, must move in a non-linear path through the chamber, the members being formed from polypropylene material, at least outer surfaces of the members being etched or micro-blasted prior to use to increase oleophilic properties thereof so as to attract and separate the oleaginous matter from the fluid passing through the chamber.

2. The device of claim 1 wherein the structure defining the chamber comprises an upright cylinder closed at a first upper end and a second lower end.

3. The device of claims 1 or 2 wherein the members substantially fill the chamber.

4. The device of claims 1 or 2 wherein the members have an outer surface with few or no corners.

5. The device of claim 4 wherein the members are solid cylindrical rods.

6. The device of claims 1 or 2 wherein the members in the chamber extend from a first end to a second end of the chamber.

7. The device of claim 6 wherein the members are packed in concentric rings with the spacing between the members in each ring decreasing from an outer ring to an inner ring.

8. The device of claim 7 wherein the concentric rings of members are disposed around a central outlet in the second lower end of the chamber.

9. The device of claim 8 wherein the outlet has a mounting for connecting the outlet to a drainage pipe.

10. The device of claim 9 wherein the drainage pipe has a first outwardly extending portion, an upwardly extending portion, a second outwardly extending portion, and then a downwardly extending portion so as to form an upwardly extending S-bend, the height of the second outwardly extending portion relative to the height of the outlet of the chamber setting the minimum depth of the fluid in the chamber when in use.

11. The device of claim 9 wherein the outlet has an extension pipe that extends upwardly into the chamber, the upper end of the upward extension of the outlet extending into an opening of a larger pipe extending downwardly from the first end and so forming a baffle through which the fluid exits the chamber, the height of the outlet extension into the chamber setting the minimum height of the fluid in the chamber at any one time to thereby form an airlock.

12. The device of claim 10 wherein the outlet of the chamber is mounted over a fluid holding container.

13. The device of claim 12 wherein the drainage pipe extends outwardly from the end of the holding container proximate its connection to the fluid outlet of the chamber.

14. The device of claim 13 wherein the fluid holding container contains a quantity of bacteria that are capable of breaking down oleaginous matter.

15. The device of claims 1 or 2 wherein a number of fluid inlets are provided into the chamber.

16. The device of claim 15 wherein each fluid inlet comprises an orifice in the outer surface of the chamber.

17. The device of claim 16 wherein the inlet further comprises a small pipe that is disposed substantially perpendicularly to the longitudinal axis of the members and substantially tangentially to the surface of the chamber.

18. The device of claim 15 wherein each fluid inlet is disposed adjacent the second lower end of the chamber.

19. The device of claims 1 or 2 wherein the chamber in turn is disposed within a larger vessel, the larger vessel comprising an upright vessel having a first upper end and a second lower end.

20. The device of claim 19 wherein the vessel is substantially octagonal in horizontal cross-section.

21. The device of claim 19 wherein the chamber is mounted adjacent the first upper end of the larger vessel and wherein, in use, the vessel is adapted such that the fluid level in the vessel is maintained above the fluid inlets of the chamber.

22. The device of claim 21 wherein the larger vessel has an inlet located proximate the first upper end thereof and arranged to direct the waste fluid substantially tangentially into and around the perimeter of the vessel.

23. The device of claims 1 or 2 wherein the oleaginous matter includes at least one of oils, grease, fats and food particles in waste water.

24. The device of claim 11 wherein the outlet of the chamber is mounted over a fluid holding container.

25. The device of claim 24 wherein the drainage pipe extends outwardly from the end of the holding container proximate its connection to the fluid outlet of the chamber.

26. The device of claim 25 wherein the fluid holding container contains a quantity of bacteria that are capable of breaking down oleaginous matter.

27. A device for separating oleaginous matter from waste fluid, comprising:
   structure defining a chamber, said chamber having a fluid inlet and a fluid outlet between which a fluid may pass through the chamber; and
   aligned members disposed within the chamber in the fluid flow path between the inlet and the outlet, the members extending from a first end to a second end of the chamber and being closely packed in concentric rings with the spacing between the members in each ring decreasing from an outer ring to an inner ring and so arranged that any oleaginous matter, if travelling perpendicularly to the alignment of the members, must move in a non-linear path through the chamber, at least outer surfaces of the members being oleophilic so as to attract and separate the oleaginous matter from the fluid passing through the chamber.

28. A device for separating oleaginous matter from waste fluid, comprising:
   structure defining a chamber, said chamber having at least one fluid inlet and a fluid outlet between which a fluid may pass through the chamber, each fluid inlet comprising a pipe in an outer surface of the chamber disposed substantially perpendicularly to the longitudinal axes of the members and substantially tangentially to the outer surface of the chamber; and
   aligned members disposed within the chamber in the fluid flow path between the inlet and outlet, the members being closely packed and so arranged that any oleaginous matter, if travelling perpendicularly to the alignment of the members, must move in a non-linear path through the chamber, at least outer surfaces of the members being oleophilic so as to attract and separate the oleaginous matter from the fluid passing through the chamber.

29. A method of separating oleaginous matter from waste fluid, including:

feeding the waste fluid through a separating device comprising structure defining a chamber, said chamber having a fluid inlet and a fluid outlet between which a fluid may pass through the chamber, said separating device further including aligned members disposed within the chamber in the fluid flow path between the inlet and the outlet, the members being closely packed and so arranged that any oleaginous matter, if travelling perpendicularly to the alignment of the members, must move in a non-linear path through the chamber, the members being formed from polypropylene material, at least outer surfaces of the members being etched or micro-blasted prior to use to increase oleophilic properties thereof so as to attract and separate the oleaginous matter from the fluid passing through the chamber.

30. A method of separating oleaginous matter from waste fluid, including:

feeding the waste fluid through a separating device comprising structure defining a chamber, said chamber having a fluid inlet and a fluid outlet between which a fluid may pass through the chamber, said separating device further including aligned members disposed within the chamber in the fluid flow path between the inlet and the outlet, the members extending from a first end to a second end of the chamber and being closely packed in concentric rings with the spacing between the members in each ring decreasing from an outer ring to an inner ring and so arranged that any oleaginous matter, if travelling perpendicularly to the alignment of the members, must move in a non-linear path through the chamber, at least outer surfaces of the members being oleophilic so as to attract and separate the oleaginous matter from the fluid passing through the chamber.

31. A method of separating oleaginous matter from waste fluid, including:

feeding the waste fluid through a separating device comprising structure defining a chamber, said chamber having at least one fluid inlet and a fluid outlet between which a fluid may pass through the chamber, each fluid inlet comprising a pipe in an outer surface of the chamber disposed substantially perpendicularly to the longitudinal axes of the members and substantially tangentially to the surface of the chamber, said separating device further including aligned members disposed within the chamber in the fluid flow path between the inlet and the outlet, the members being closely packed and so arranged that any oleaginous matter, if travelling perpendicularly to the alignment of the members, must move in a non-linear path through the chamber, at least outer surfaces of the members being oleophilic so as to attract and separate the oleaginous matter from the fluid passing through the chamber.

* * * * *